(12) United States Patent
Nishitani et al.

(10) Patent No.: US 8,828,261 B2
(45) Date of Patent: Sep. 9, 2014

(54) ELECTROLYTIC SOLUTION FOR ALUMINUM ELECTROLYTIC CAPACITOR, AND ALUMINUM ELECTROLYTIC CAPACITOR USING SAME

(75) Inventors: Satoshi Nishitani, Kyoto (JP); Yuichiro Tsubaki, Kyoto (JP); Satoshi Yamashita, Nagaokakyo (JP); Yasuhiro Ueda, Otsu (JP)

(73) Assignees: Panasonic Corporation, Kadoma-shi (JP); Sanyo Chemical Industries, Ltd., Kyoto-shi (JP)

( * ) Notice: Subject to any disclaimer, the term of this patent is extended or adjusted under 35 U.S.C. 154(b) by 183 days.

(21) Appl. No.: 13/511,274

(22) PCT Filed: Oct. 22, 2010

(86) PCT No.: PCT/JP2010/006258
§ 371 (c)(1),
(2), (4) Date: May 22, 2012

(87) PCT Pub. No.: WO2011/064939
PCT Pub. Date: Jun. 3, 2011

(65) Prior Publication Data
US 2012/0235072 A1 Sep. 20, 2012

(30) Foreign Application Priority Data
Nov. 26, 2009 (JP) ................. 2009-268530

(51) Int. Cl.
*H01G 9/035* (2006.01)
*H01G 9/045* (2006.01)

(52) U.S. Cl.
CPC .................. *H01G 9/035* (2013.01); *H01G 9/045* (2013.01)
USPC ......................... 252/62.2; 361/509

(58) Field of Classification Search
CPC .......... H01M 2300/0025; H01G 9/035; H01G 9/045; H01G 2009/0025
USPC ......................... 252/62.2; 361/509
See application file for complete search history.

(56) References Cited

U.S. PATENT DOCUMENTS 8,177,994 B2 * 5/2012 Taguchi et al. ............... 252/62.2

FOREIGN PATENT DOCUMENTS

| JP | 9-213583 A | 8/1997 |
| JP | 2966451 B2 | 10/1999 |
| JP | 2008-34257 A | 2/2008 |
| JP | 2008-135693 A | 6/2008 |
| WO | WO 2007/148430 | * 12/2007 |

OTHER PUBLICATIONS

International Search Report of PCT/JP2010/006258, mailing date of Jan. 18, 2011.

* cited by examiner

*Primary Examiner* — Carol M Koslow
(74) *Attorney, Agent, or Firm* — Westerman, Hattori, Daniels & Adrian, LLP

(57) ABSTRACT

Provided is an electrolytic solution for an aluminum electrolytic capacitor, which shows a specific conductivity, a high sparking voltage, and a characteristic of causing only a slight expansion of the capacitor in the reflow process, each being comparable with conventional alkyl phosphate anions, and which has high reliability without causing a short circuit. Also provided is an aluminum electrolytic capacitor. The present invention is directed to an electrolytic solution for an aluminum electrolytic capacitor, comprising an electrolyte (C) comprising an alkyl phosphate anion (a) represented by the general formula (1)/(2) and an amidinium cation (b); a borate ester (H) which is obtained by reacting boric acid (d) with diethylene glycol (e) and a polyalkylene glycol (f) having a molecular weight of 130-350 and/or a polyalkylene glycol monoalkyl ether (g) having a molecular weight of 130-350, and which has a boron content of 5-14 wt %; and an organic solvent (J).

18 Claims, No Drawings

ELECTROLYTIC SOLUTION FOR ALUMINUM ELECTROLYTIC CAPACITOR, AND ALUMINUM ELECTROLYTIC CAPACITOR USING SAME

TECHNICAL FIELD

The present invention relates to an electrolytic solution for an aluminum electrolytic capacitor and to an electrolytic capacitor using the same.

BACKGROUND ART

As conventional electrolytic solutions for electrolytic capacitors, there are known such electrolytic solutions as one using a tertiary ammonium salt of an aromatic carboxylic acid such as phthalic acid and the like as an electrolyte salt, one using a tertiary ammonium salt of maleic acid as an electrolyte salt, one using an electrolyte salt containing amidines as a cationic component, and the like.

This electrolyte salt containing amidines as the cationic component has a high specific conductivity and can make the resistance of the capacitor lower. Also, because electrolysis products disappear rapidly due to a reaction of hydroxide ions formed by an electrochemical reaction and amidine groups, N—C—N, this electrolyte salt does not deteriorate or corrode the resins, rubbers, and metals which are materials constituting the capacitor and thus has a characteristic of excellent reliability.

However, despite its excellent characteristics, this electrolytic solution using an electrolyte salt comprising amidines as the cationic component, has had a problem that the withstand voltage thereof is low, the withstand voltage being an indispensable characteristic for the electrolytic capacitor, especially for the aluminum electrolytic capacitor.

In order to solve the above-described problem, there has been proposed an electrolytic solution for driving the electrolytic capacitor, obtained by adding at least one selected from a polyhydric alcohol, boric acid, and a complex compound formed between boric acid and a polyhydric alcohol to an electrolytic solution which comprises amidine salts and wherein the concentration of the electrolyte salt is 5-25 wt % (see, for example, Patent Document 1).

On the other hand, recently, the switch from leaded solder to lead-free solder is progressing for the purpose of decreasing the amount of use of environmental loading materials. In order to respond to this lead-free solder, it is necessary to raise the temperature of the reflow process to 260° C. However, according to the method of the above-described Patent Document, condensation water is generated from the polyhydric alcohol, boric acid, and the complex compound formed between boric acid and the polyhydric alcohol, resulting in high water percentage inside the capacitor. The water inside the capacitor evaporates by heat (for example 260° C.) inside the oven for reflow of lead-free solder (hereinafter abbreviated as reflow) and the internal pressure rises, causing occurrence of expansion of the capacitors and thereby making it difficult to surface mount the capacitors on the substrates. In other words, it is necessary to maintain the water content in the electrolytic solution low in order to suppress the expansion caused by reflow.

Therefore, there has been proposed an electrolytic solution in which the polyhydric alcohol, boric acid, and the complex compound formed between boric acid and polyhydric alcohol, which generate water, are not used but which comprises an alkyl phosphate anion having a high sparking voltage (see, for example, Patent Document 2).

PRIOR ART DOCUMENTS

Patent Documents

Patent Document 1: Japanese Patent Application Laid-Open No. H9-213583

Patent Document 2: Japanese Patent Application Laid-Open No. 2008-135693

SUMMARY OF THE INVENTION

Problems to be Solved by the Invention

However, even though the electrolytic solution using the alkyl phosphate anion shows a high sparking voltage, there have been cases where the sparking voltage of the electrolytic solution becomes unstable and a difficulty has existed that, though rarely, a short circuit occurs suddenly at the time of application of a voltage. That is, the problems of the present invention are to provide an electrolytic solution for an aluminum electrolytic capacitor, which shows a specific conductivity, a high sparking voltage, and a characteristic of causing only a slight expansion of the capacitor in the reflow process, each being comparable with conventional alkyl phosphate anions, and which has high reliability without causing a short circuit; and to provide an aluminum electrolytic capacitor.

Means for Solving the Problems

In order to solve the above-described difficulty, the present inventors conducted diligent research on the above-described problems and, as a result, found that the above-described two problems can be solved by adding a specific borate ester to the electrolytic solution in which the alkyl phosphate anion is used. The present invention has been completed based on this finding.

That is, the present invention is directed to an electrolytic solution for an aluminum electrolytic capacitor comprising an electrolyte (C) comprising an alkyl phosphate anion (a) represented by the following general formula (1) or (2) and an amidinium cation (b), a borate ester (H) which is obtained by reacting boric acid (d) with diethylene glycol (e) and a polyalkylene glycol (f) having a molecular weight of 130-350 and/or a polyalkylene glycol monoalkyl ether (g) having a molecular weight of 130-350 and which has a boron content of 5-14 wt %, and an organic solvent (J); and to an aluminum electrolytic capacitor using the electrolytic solution:

[Formula 1]

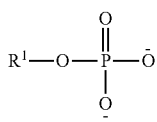

(1)

-continued

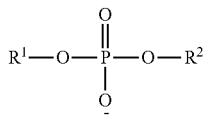
(2)

wherein $R^2$ is an alkyl group having 1-10 carbon atoms and $R^2$ is a hydrogen atom or an alkyl group having 1-10 carbon atoms; $R^1$ and $R^2$ may be the same or different.

Effects of the Invention

The aluminum electrolytic capacitor using the electrolytic solution of the present invention shows a resistance, a high withstand voltage, and a characteristic causing only a slight expansion of the capacitor in the reflow process, each being comparable with conventional electrolytic solutions, and has high reliability without causing a short circuit.

MODE FOR CARRYING OUT THE INVENTION

Hereinafter, modes of the present invention will be described.

<Borate Ester (H)>

The borate ester (H) is obtained by reacting boric acid (d) with diethylene glycol (e) and a polyalkylene glycol (f) having a molecular weight of 130-350 and/or a polyalkylene glycol monoalkyl ether (g) having a molecular weight of 130-350. That is, (H) is obtained by reacting any of the following combinations of raw materials: (d), (e), and (f); (d), (e), and (g); or (d), (e), (f), and (g).

Reaction condition: the above-described combination of raw materials are mixed, and the mixture is heated to 60-90° C. and esterified (dehydrated) by gradually reducing the pressure to 25-45 Torr. The reaction mixture is further esterified by heating up to 100-110° C. The reaction is carried out until water and low-boiling materials are distilled off to obtain the borate ester (H) as a viscous liquid.

The viscosity of the borate ester (H) at 40° C. is preferably 2-30 Pa·s and more preferably 5-15 Pa·s. The viscosity is measured by means of a rheometer.

When producing the borate ester (H), the ratio of each raw material charged is as follows: boric acid (d) is 25-80 wt %, and more preferably 40 to 60 wt %; diethylene glycol (e) is 10-65 wt %, and more preferably 15-40 wt %; polyalkylene glycol (f) is 10-65 wt %, and more preferably 15-40 wt %; and monoalkyl ether (g) of (f) is 10-65 wt %, and more preferably 15-40 wt %. However, the total wt % of (e) and (f); (e) and (g); or (e), (f), and (g) is 20-75 wt %, and more preferably 40-60 wt %.

The boron content in the borate ester (H) is 5-14 wt %, more preferably 6-13 wt %. When the boron content in the borate ester (H) is less than 5 wt %, its effect is small from the viewpoint of suppressing sudden occurrence of a short circuit. When the boron content in the borate ester (H) exceeds 14 wt %, there is a difficulty from the viewpoint of synthesis of the borate ester (H) and also (H) is difficult to dissolve in the electrolytic solution.

The boron content in the borate ester (H) can be measured by the following method.

A sample (S g) is weighed into a 100 ml beaker and 50 ml of a glycerin solution (glycerin:ion-exchanged water=1:1 v/v) is added thereto. The solution is potentiometrically titrated with a 0.1 mol/l standard potassium hydroxide solution and the amount (A ml) of the 0.1 mol/l standard potassium hydroxide solution required to titrate to an inflection point is determined.

The boron content is calculated according to the following equation and when the results of tests carried out twice or more agree with a difference of 0.2% or less as a boric acid content, the average is calculated down to the second decimal place.

Boron content (wt %)={($A \times f \times 1.08$)/($S \times 1000$)}×100 wherein f represents the titer of the 0.1 mol/l standard potassium hydroxide solution.

The content of the borate ester (H) is, from the viewpoint of compatibility of specific conductivity and sparking voltage, preferably 1-30 wt %, and especially preferably 2-20 wt % based on the total weight of the borate ester (H), the electrolyte (C), and the organic solvent (J).

The polyalkylene glycol (f) and/or the polyalkylene glycol monoalkyl ether (g) are high molecular weight materials produced artificially by a polymerization reaction of low molecular weight monomers which are obtained from petroleum, coal, carbide, and the like as raw materials, and are preferably obtained by polymerization according to at least one process selected from the group consisting of polyaddition and addition polymerization. As the low molecular weight monomers, preferable are ethylene oxide and propylene oxide.

The molecular weights of the polyalkylene glycol (f) and polyalkylene glycol monoalkyl ether (g) are 130-350. More preferably, the molecular weights thereof are 150-250.

When the number average molecular weights of (f) and (g) are less than 130, (f) and (g) permeate through the sealing rubber of the capacitor to precipitate boric acid and cause a short circuit of the capacitor, which is not desirable. Furthermore, (f) and (g) with number average molecular weights of more than 350 are not desirable because, when they are converted to borate esters, they become difficult to handle and lower the specific conductivity of the eletrolytic solution because of their high viscosity.

The polyalkylene glycol (f) includes the following.

Ethylene Glycols

Ethylene glycol, diethylene glycol, triethylene glycol, tetraethylene glycol, pentaethylene glycol, hexaethylene glycol, heptaethylene glycol, and the like.

Propylene Glycols

Propylene glycol, dipropylene glycol, tripropylene glycol, tetrapropylene glycol, pentapropylene glycol, and the like.

Ethylene Oxide-Propylene Oxide Copolymers

Ethylene oxide-propylene oxide copolymers (hereinafter described as EO/PO copolymers) are copolymers of ethylene glycol or propylene glycol with ethylene oxide and propylene oxide, and are copolymers comprising one structure selected from the random, block, and alternating structures and having a molecular weight of 130-350.

The polyalkylene glycol monoalkyl ether (g) includes the following. The alkyl group of (g) is preferably an alkyl group having 1-3 carbon atoms.

Monoalkyl Ethers of Ethylene Glycols

2-Methoxyethanol, diethylene glycol monomethyl ether, triethylene glycol monomethyl ether, tetraethylene glycol monomethyl ether, pentaethylene glycol monomethyl ether, hexaethylene glycol monomethyl ether, heptaethylene glycol monomethyl ether, and the like.

2-Ethoxyethanol, diethylene glycol monoethyl ether, triethylene glycol monoethyl ether, tetraethylene glycol monoethyl ether, pentaethylene glycol monoethyl ether, hexaethylene glycol monoethyl ether, and the like.

Ethylene glycol monopropyl ether, diethylene glycol monopropyl ether, triethylene glycol monopropyl ether, tetraethylene glycol monopropyl ether, pentaethylene glycol monopropyl ether, hexaethylene glycol monopropyl ether, and the like.

Ethylene glycol monoisopropyl ether, diethylene glycol monoisopropyl ether, triethylene glycol monoisopropyl ether, tertaethylene glycol monoisopropyl ether, pentaethylene glycol monoisopropyl ether, hexaethylene glycol monoisopropyl ether, and the like.

Monoalkyl Ethers of Propylene Glycols

1-Methoxy-2-propanol, dipropylene glycol monomethyl ether, tripropylene glycol monomethyl ether, tetrapropylene glycol monomethyl ether, pentapropylene glycol monomethyl ether, and the like.

1-Ethoxy-2-propanol, dipropylene glycol monoethyl ether, tripropylene glycol monoethyl ether, tetrapropylene glycol monoethyl ether, pentapropylene glycol monoethyl ether and the like.

Propylene glycol monopropyl ether, dipropylene glycol monopropyl ether, tripropylene glycol monopropyl ether, tertapropylene glycol monopropyl ether, and the like.

Propylene glycolmonoisopropylether, dipropylene glycol monoisopropyl ether, tripropylene glycol monoisopropyl ether, tetrapropylene glycol monoisopropyl ether, and the like.

Monoalkyl Ethers of EO/PO Copolymers

Ethers obtained by substituting the hydrogen atom at one end of the EO/PO copolymers with an alkyl group having 1-3 carbon atoms, the ethers having a molecular weight of 130-350.

Among (f) and (g), preferable is (g) and, among (g), more preferable are the monoalkyl ethers of EO/PO copolymers and the monoalkyl ethers of ethylene glycols. Especially preferable are the monoalkyl ethers of ethylene glycols.

<Electrolyte (C)>

The electrolyte (C) is a salt comprising an alkyl phosphate anion (a) and an amidinium cation (b).

The alkyl phosphate anion (a) includes a monoanion and a dianion of (a1) monoalkyl phosphate and a monoanion of (a2) dialkyl phosphate. Specific examples are described in the following.

(a1) Monoalkyl Phosphate {Corresponding to the Alkyl Phosphate Anion (Dianion) Represented by the General Formula (1) and the Alkyl Phosphate Anion Represented by the General Formula (2) (Wherein $R^2$ is a Hydrogen Atom; Monoanion)}

Monomethyl phosphate, monoethyl phosphate, monopropyl phosphates [mono(n-propyl)phosphate and mono(iso-propyl)phosphate], monobutyl phosphates [mono(n-butyl)phosphate, mono(iso-butyl)phosphate, and mono(tert-butyl)phosphate], monopentyl phosphate, monohexyl phosphate, monoheptyl phosphate, monooctyl phosphates [mono(2-ethylhexyl)phosphate and the like], and the like.

(a2) Dialkyl Phosphate {Corresponding to the Alkyl Phosphate Anion (Monoanion) Represented by the General Formula (2)}

Dimethyl phosphate, diethyl phosphate, dipropyl phosphates [di(n-propyl)phosphate and di(iso-propyl)phosphate], dibutyl phosphates [di(n-butyl)phosphate, di(iso-butyl)phosphate, and di(tert-butyl)phosphate], dipentyl phosphate, dihexyl phosphate, diheptyl phosphate, dioctyl phosphates [bis(2-ethylhexyl)phosphate and the like], and the like.

The alkyl phosphate anion (a) may be used alone or in a combination of two or more kinds. Furthermore, there may be used a mixture of the monoanion and the dianion.

Of these, preferable is the monoanion represented by the general formula (2), wherein $R^1$ and $R^2$ are alkyl groups having 1 to 8 carbon atoms; and more preferable are dimethyl phosphate anion, diethyl phosphate anion, di(n-propyl)phosphate anion, di(iso-propyl)phosphate anion, di(n-butyl)phosphate anion, di(iso-butyl)phosphate anion, di(tert-butyl)phosphate anion, and bis(2-ethylhexyl)phosphate anion.

Generally, the industrially available alkyl phosphate is a mixture of monoalkyl phosphate, dialkyl phosphate, and trialkyl phosphate. However, in the present invention, it is preferable to use the dialkyl phosphate as the alkyl phosphate anion (a). While the method for obtaining the dialkyl phosphate anion is not particularly limited, preferable is a method where an imidazolium salt (monomethyl carbonate salt, hydroxide salt, and the like) and an industrially available trialkyl phosphate are mixed and subjected to hydrolysis to obtain a salt of an imidazolium cation and the dialkyl phosphate anion.

The amidinium cation (b) includes a cyclic amidinium cation and a chain amidinium cation, of which the cyclic amidinium cation is preferable. As the cyclic amidinium cation, (b1) an imidazolinium cation and (b2) an imidazolium cation are more preferable.

(b1) Imidazolinium Cation 1,2,3,4-Tetramethylimimdazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethylimidazolinium, 1,2,3-trimethylimidazolinium, 1,3-dimethyl-2-ethylimidazolinium, 1-ethyl-2,3-dimethylimidazolinium, 1,2,3-triethylimidazolinium, 4-cyano-1,2,3-trimethylimidazolinium, 3-cyanomethyl-1,2-dimethylimidazolinium, 2-cyanomethyl-1,3-dimethylimidazolinium, 4-acetyl-1,2,3-trimethylimidazolinium, 3-acetylmethyl-1,2-dimethylimidazolinium, 4-methylcarboxymethyl-1,2,3-trimethylimidazolinium, 3-methylcarboxymethyl-1,2-dimethylimidazolinium, 4-methoxy-1,2,3-trimethylimidazolinium, 3-methoxymethyl-1,2-dimethylimidazolinium, 4-formyl-1,2,3-trimethylimidazolinium, 3-formylmethyl-1,2-dimethylimidazolinium, 3-hydroxyethyl-1,2-dimethylimidazolinium, 4-hydroxymethyl-1,2,3-trimethylimidazolinium, 2-hydroxyethyl-1,3-dimethylimidazolinium, and the like.

(b2) Imidazolium Cation 1,3-dimethylimidazolium, 1,3-diethylimidazolium, 1-ethyl-3-methylimidazolium, 1,2,3-trimethylimidazolium, 1,2,3,4-tetramethylimidazolium, 1,3-dimethyl-2-ethylimidazolium, 1-ethyl-2,3-dimethylimidazolium, 1,2,3-triethylimidazolium, 1,2,3,4-tetraethylimidazolium, 1,3-dimethyl-2-phenylimidazolium, 1,3-dimethyl-2-benzylimidazolium, 1-benzyl-2,3-dimethylimidazolium, 4-cyano-1,2,3-trimethylimidazolium, 3-cyanomethyl-1,2-dimethylimidazolium, 2-cyanomethyl-1,3-dimethylimidazolium, 4-acetyl-1,2,3-trimethylimidazolium, 3-acetylmethyl-1,2-dimethylimidazolium, 4-methylcarboxymethyl-1,2,3-trimethylimidazolium, 3-methylcarboxymethyl-1,2-dimethylimidazolium, 4-methoxy-1,2,3-trimethylimidazolium, 3-methoxymethyl-1,2-dimethylimidazolium, 4-formyl-1,2,3-trimethylimidazolium, 3-formylmethyl-1,2-dimethylimidazolium, 3-hydroxyethyl-1,2-dimethylimidazolium, 4-hydroxymethyl-1,2,3-trimethylimidazolium, 2-hydroxyethyl-1,3-dimethylimidazolium, and the like.

The amidinium cation may be used alone or in a combination of two or more kinds. Among those described above, more preferable are 1,2,3,4-tetramethylimidazolinium cation, 1-ethyl-2,3-dimethylimidazolinium cation, 1-ethyl-3-methylimidazolium cation, and 1-ethyl-2,3-dimethylimidazolium cation.

Examples of a combination of the alkyl phosphate anion (a) and the amidinium cation (b) include: a mixture of monoanion and monocation; a mixture of dianion and monocation; a mixture of monoanion and dianion, and monocation; and the like.

The electrolyte (C) includes 1,2,3,4-tetramethyl imidazolinium monomethyl phosphate anion, 1,2,3,4-tetramethylimidazolinium dimethyl phosphate anion, 1,2,3,4-tetramethylimidazolinium monoethyl phosphate anion, 1,2,3,4-tetramethylimidazolinium diethyl phosphate anion, 1,2,3,4-tetramethylimidazolinium mono(n-propyl)phosphate anion, 1,2,3,4-tetramethylimidazolinium di(n-propyl)phosphate anion, 1,2,3,4-tetramethylimidazolinium mono(iso-propyl)phosphate anion, 1,2,3,4-tetramethylimidazolinium di(iso-propyl)phosphate anion, 1,2,3,4-tetramethylimidazolinium mono(n-butyl)phosphate anion, 1,2,3,4-tetramethylimidazolinium di(n-butyl)phosphate anion, 1,2,3,4-tetramethylimidazolinium mono(iso-butyl)phosphate anion, 1,2,3,4-tetramethylimidazolinium di(iso-butyl)phosphate anion, 1,2,3,4-tetramethylimidazolinium mono(tert-butyl)phosphate anion, 1,2,3,4-tetramethylimidazolinium di(tert-butyl)phosphate anion, 1,2,3,4-tetramethylimidazolinium mono(2-ethylhexyl)phosphate anion, 1,2,3,4-tetramethylimidazolinium bis(2-ethylhexyl)phosphate anion, 1-ethyl-2,3-dimethylimidazolinium monoethyl phosphate anion, 1-ethyl-2,3-dimethylimidazolinium diethyl phosphate anion, 1-ethyl-3-methylimidazolium monoethyl phosphate anion, 1-ethyl-3-methylimidazolium diethyl phosphate anion, 1-ethyl-2,3-dimethylimidazolium monoethyl phosphate anion, 1-ethyl-2,3-dimethylimidazolium diethylphosphate anion, and the like. Among these, preferable is 1,2,3,4-tetramethylimidazolinium diethylphosphate anion.

<Organic Solvent (J)>

The organic solvent (J) includes (1) an alcohol, (2) an ether, (3) an amide, (4) an oxazolidinone, (5) a lactone, (6) a nitrile, (7) a carbonate, (8) a sulfone, and (9) other organic solvents.

(1) Alcohol

Monohydric alcohols (methyl alcohol, ethyl alcohol, propyl alcohol, butyl alcohol, diacetone alcohol, benzyl alcohol, amino alcohol, 2-methoxyethanol, diethylene glycol monomethyl ether, furfuryl alcohol, and the like), dihydric alcohols (ethylene glycol (hereinafter denoted EG), propylene glycol, diethylene glycol, hexylene glycol, 3-methoxy-1,2-propanediol, and the like), trihydric alcohols (glycerin and the like), tetra- or higher hydric alcohols (hexitol and the like), and the like.

(2) Ether

Monoethers (ethylene glycol monomethyl ether, ethylene glycol monoethyl ether, ethylene glycol monophenyl ether, tetrahydrofuran, 3-methyltetrahydrofuran, and the like), diethers (ethylene glycol dimethyl ether, ethylene glycol diethyl ether, diethylene glycol monomethyl ether, diethylene glycol monoethyl ether, and the like.), triethers (diethylene glycol dimethyl ether, diethylene glycol diethyl ether, and the like), and the like.

(3) Amide

Formamides (N-methylformamide, N,N-dimethylformamide, N-ethylformamide, N,N-diethylformamide, and the like), acetamides (N-methylacetamide, N,N-dimethylacetamide, N-ethylacetamide, N,N-diethylacetamide, and the like), propionamides (N,N-dimethylpropionamide and the like), pyrrolidones (N-methylpyrrolidone, N-ethylpyrrolidone, and the like), hexamethyl phosphoryl amide, and the like.

(4) Oxazolidinone

N-methyl-2-oxazolidinone, 3,5-dimethyl-2-oxazolidinone, and the like.

(5) Lactone

γ-Butyrolactone (hereinafter denoted GBL), α-acetyl-γ-butyrolactone, β-butyrolactone, γ-valerolactone, σ-valerolactone, and the like.

(6) Nitrile

Acetonitrile, propionitrile, butyronitrile, acrylonitrile, methacrylonitrile, benzonitrile, and the like.

(7) Carbonate

Ethylene carbonate, propylene carbonate, butylene carbonate, dimethyl carbonate, diethyl carbonate, and the like.

(8) Sulfone

Sulfolane (hereinafter denoted SL), dimethyl sulfoxide, dimethylsulfone, and the like.

(9) Other Organic Solvents 1,3-Dimethyl-2-imidazolidinone, aromatic solvents (toluene, xylene, and the like), paraffin solvents (normal paraffins, isoparaffins, and the like), and the like.

The organic solvent may be used alone or in a combination of two or more kinds. Among these, preferable are an alcohol, a lactone, and a sulfone, and more preferable are γ-butyrolactone, sulfolane, and ethylene glycol.

From the viewpoint of specific conductivity and solubility in organic solvents, the content of the electrolyte (C) is preferably 2-70 wt %, and particularly preferably 4-40 wt %, and more preferably 15-35 wt %, based on the total weight of the electrolyte (C), the borate ester (H), and the organic solvent (J).

From the viewpoint of specific conductivity, the content of the organic solvent (J) is preferably 30-98 wt %, and particularly preferably 60-96 wt %, based on the total weight of the electrolyte (C), the borate ester (H), and the organic solvent (J).

The method for producing the electrolytic solution of the present invention is not particularly limited but includes methods such as:

(1) a method comprising charging the electrolyte (C), the borate ester (H), and the organic solvent (J) in one portion and dissolving them together, (2) a method comprising dissolving (C) in (J) and subsequently dissolving (H) in the solution of (C) and (J), (3) a method comprising dissolving (H) in (J) and subsequently dissolving (C) in the solution of (H) and (J), and (4) a method comprising mixing and melting (C) and (H), and subsequently dissolving the molten material in (J).

The method of dissolution depends on the scale of production but includes, for example, a method where the materials are stirred by using a conventional paddle stirring blade at room temperature or at 80-140° C. until homogeneous dissolution is achieved.

In addition, when (C) and (H) are to be dissolved, first (C) and/or (H) are dissolved in part of (J) and the resultant solution may be added to and dissolved in (J) or in a solution of (C) or (H) in (J).

Among these, it is preferable to add a solution of (H) in the organic solvent (J) to a solution of (C) in the organic solvent (J) and dissolve them together.

The electrolytic solution of the present invention preferably further comprises an ammonium salt (N) of a polyvalent carboxylic acid.

By including (N) in an amount of 0-10 wt %, preferably 1-5 wt %, the specific conductivity of the electrolytic solution of the present invention can be improved while maintaining the ability thereof to withstand reflow conditions and to suppress occurrence of a short circuit.

The ammonium salt (N) of a polyvalent carboxylic acid is a salt comprising an anion (m) of a polyvalent carboxylic acid and an ammonium cation (k).

The polyvalent carboxylic acid includes the following examples.

Two to four-valent polycarboxylic acids having 2-15 carbon atoms: aliphatic polycarboxylic acids [saturated polycarboxylic acids (oxalic acid, malonic acid, succinic acid, glutaric acid, adipic acid, pimelic acid, suberic acid, azelaic acid, sebacic acid, and the like), unsaturated polycarboxylic acids (maleic acid, fumaric acid, itaconic acid, and the like)], aromatic polycarboxylic acids [phthalic acid, isophthalic acid, terephthalic acid, trimellitic acid, pyromellitic acid, and the like], S-containing polycarboxylic acids [thiodipropionic acid and the like]. Oxycarboxylic acids having 2-20 carbon atoms: aliphatic oxycarboxylic acids [glycolic acid, lactic acid, tartaric acid, castor oil aliphatic acid, and the like]; aromatic oxycarboxylic acids [salicylic acid, mandelic acid, and the like]; monocarboxylic acids having 1-30 carbon atoms: aliphatic monocarboxylic acids [saturated monocarboxylic acids (formic acid, acetic acid, propionic acid, butyric acid, isobutyric acid, valeric acid, caproic acid, enanthic acid, caprylic acid, pelargonic acid, lauric acid, myristic acid, stearic acid, behenic acid, and the like), unsaturated monocarboxylic acids (acrylic acid, methacrylic acid, crotonic acid, oleic acid, and the like)]; aromatic monocarboxylic acids [benzoic acid, cinnamic acid, naphthoic acid, and the like].

The ammonium cation (k) includes a tetraalkyl quaternary ammonium cation, a trialkyl tertiary ammonium cation, and an amidinium cation.

The tetraalkyl quaternary ammonium cation includes cyclic tetraalkyl quaternary ammonium cations and chain tetraalkyl quaternary ammonium cations.

The trialkyl tertiary ammonium cation includes cyclic trialkyl tertiary ammonium cations and chain trialkyl tertiary ammonium cations.

The amidinium cations include cyclic amidinium cations and chain amidinium cations, of which the cyclic amidinium cations are preferable. As the cyclic amidinium cations, more preferable are the imidazolinium cations and imidazolium cations.

As the ammonium salt (N) of the polyvalent carboxylic acid, preferable are tetraethylammonium phthalate monoanion, triethylammonium phthalate monoanion, 1,2,3,4-tetramethylimidazolinium phthalate monoanion, and the like.

To the electrolytic solution of the present invention, if necessary, there may be added various additives which are usually used for electrolytic solutions. The additives include nitro compounds (for example, o-nitrobenzoic acid, p-nitrobenzoic acid, m-nitrobenzoic acid, o-nitrophenol, p-nitrophenol, and the like) and the like. The amount of addition thereof is, from the viewpoint of specific conductivity and solubility in the electrolytic solution, preferably 5 wt % or less, and particularly preferably 2 wt % or less based on the weight of the electrolyte (C) and the organic solvent (J).

The electrolytic solution of the present invention is suitable for an aluminum electrolytic capacitor. The aluminum electrolytic capacitor is not particularly limited and includes, for example, a wound aluminum electrolytic capacitor which is constructed by winding an anode with aluminum oxide formed on the anode surface (aluminum oxide foil) and a cathode aluminum foil with a separator interposed therebetween. An aluminum electrolytic capacitor can be constructed by impregnating the separator with the electrolytic solution of the present invention used as the driving electrolytic solution, placing the separator together with an anode and a cathode into a cylindrical aluminum case with a bottom, and thereafter sealing the opening of the aluminum case with a sealing rubber.

EXAMPLES

Hereinafter, specific examples of the present invention will be described but the present invention is not limited thereto. In the following, "part" represents weight.

Production Example 1

Production of Electrolyte (C-1)

By adding dropwise 10 parts of 2,4-dimethylimidazoline to 74 parts of a methanol solution containing 16 parts of dimethyl carbonate and stirring at 120° C. for 15 hours, there was obtained a methanol solution of 1,2,3,4-tetramethylimidazolinium methyl carbonate salt.

By adding 62 parts of tributyl phosphate to the above-described methanol solution of 46 parts of 1,2,3,4-tetramethylimidazolinium methylcarbonate salt, followed by addition of 5.4 parts of water and stirring at 100° C. for 20 hours, tributyl phosphate was hydrolyzed and a salt exchange reaction was carried out to obtain a methanol solution of 1,2,3,4-tetramethylimidazolinium dibutyl phosphate monoanion. The above-described solution was heated under reduced pressure of 1.0 kPa or less at 50° C. to distill methanol until no distillate of methanol was observed. Thereafter, the temperature was raised from 50° C. to 100° C. and heating was continued for 30 minutes to distill and remove monomethyl carbonate ($HOCO_2CH_3$), methanol, and carbon dioxide (slight amounts of methanol and carbon dioxide are formed by thermal decomposition of monomethyl carbonate. Hereinafter, these are abbreviated as by-products). Thus, 1,2,3,4-tetramethylimidazolinium dibutyl phosphate monoanion, electrolyte (C-1), was obtained. The yield was 99 parts (yield based on the weight of 46 parts of 1,2,3,4-tetramethylimidazolinium methyl carbonate salt; hereinafter the same shall apply). The molecular weight of the electrolyte (C-1) was 280.

Production Example 2

Production of Borate Ester (H-1)

Boric acid (50 parts), diethylene glycol (20 parts), and tetraethylene glycol monomethyl ether (molecular weight 208) (30 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-1). The boron content of the borate ester (H-1) was 9.4%. The viscosity of (H-1) at 40° C. was 10.7 Pa·s.

Example 1

The electrolyte (C-1), 25 parts, was dissolved in 69 parts of an organic solvent (J-1), γ-butyrolactone. Thereto was added and mixed 6 parts of the borate ester (H-1) to obtain an electrolytic solution of the present invention. The water content was 0.6 part. The concentration of (H-1) and the concentration of (C-1) were 6 wt % and 25 wt %, respectively, relative to the total weight of (C-1), (J-1), and (H-1).

Production Example 3

Production of Borate Ester (H-2)

Boric acid (25 parts), diethylene glycol (45 parts), and diethylene glycol monoethyl ether (molecular weight 134)

(30 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-2). The boron content of the borate ester (H-2) was 5.1%. The viscosity of (H-2) at 40° C. was 7.2 Pa·s.

Example 2

The electrolyte (C-1), 25 parts, was dissolved in 69 parts of the organic solvent (J-1), γ-butyrolactone. Thereto was added and mixed 6 parts of the borate ester (H-2) to obtain an electrolytic solution of the present invention. The water content was 0.7 part. The concentration of (H-2) and the concentration of (C-1) were 6 wt % and 25 wt %, respectively, relative to the total weight of (C-1), (J-1), and (H-2).

Production Example 4

Production of Borate Ester (H-3)

Boric acid (65 parts), diethylene glycol (21 parts), and pentapropylene glycol monoethyl ether (molecular weight 336) (14 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-3). The boron content of the borate ester (H-3) was 13.9%. The viscosity of (H-3) at 40° C. was 14.2 Pa·s.

Example 3

The electrolyte (C-1), 25 parts, was dissolved in 69 parts of the organic solvent (J-1), γ-butyrolactone. Thereto was added and mixed 6 parts of the borate ester (H-3) to obtain an electrolytic solution of the present invention. The water content was 0.6 part. The concentration of (H-3) and the concentration of (C-1) were 6 wt % and 25 wt %, respectively, relative to the total weight of (C-1), (J-1), and (H-3).

Production Example 5

Production of Electrolyte (C-2)

By adding dropwise 10 parts of 2,4-dimethylimidazoline to 74 parts of a methanol solution containing 16 parts of dimethyl carbonate and stirring at 120° C. for 15 hours, there was obtained a methanol solution of 1,2,3,4-tetramethyl imidazolinium methyl carbonate salt.

By adding 42 parts of triethyl phosphate (TEP: produced by Daihachi Chemical Industries Co., Ltd.) to the methanol solution of 46 parts of 1,2,3,4-tetramethylimidazolinium methyl carbonate salt obtained in Production Example 1, followed by addition of 5.4 parts of water and stirring at 100° C. for 20 hours, triethyl phosphate was hydrolyzed and a salt exchange reaction was carried out to obtain a methanol solution of 1,2,3,4-tetramethylimidazolinium diethyl phosphate monoanion. The above-described solution was heated under reduced pressure of 1.0 kPa or less at 50° C. to distill methanol until no distillate of methanol was observed. Thereafter, the temperature was raised from 50° C. to 100° C. and heating was continued for 30 minutes to distill and remove monomethyl carbonate ($HOCO_2CH_3$), methanol, and carbon dioxide (slight amounts of methanol and carbon dioxide are formed by thermal decomposition of monomethyl carbonate. Hereinafter, these are abbreviated as by-products). Thus, 1,2,3,4-tetramethylimidazolinium diethyl phosphate monoanion, electrolyte (C-2), was obtained. The yield was 99 parts (yield based on the weight of 46 parts of 1,2,3,4-tetramethylimidazolinium methyl carbonate salt; hereinafter the same shall apply). The molecular weight of the electrolyte (C-2) was 280.

Production Example 6

Production of Borate Ester (H-4)

Boric acid (50 parts), diethylene glycol (20 parts), and a monoethyl ether of EO/PO copolymer (molecular weight 222, weight ratio of ethylene oxide and propylene oxide=3/1, mode of addition: block) (30 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-4). The boron content of the borate ester (H-4) was 9.5%. The viscosity of (H-4) at 40° C. was 8.3 Pa·s.

Example 4

The electrolyte (C-2), 25 parts, was dissolved in 69 parts of the organic solvent (J-1), γ-butyrolactone. Thereto was added and mixed 6 parts of the borate ester (H-4) to obtain an electrolytic solution of the present invention. The water content was 0.8 part. The concentration of (H-4) and the concentration of (C-2) were 6 wt % and 25 wt %, respectively, relative the total weight of (C-2), (J-1), and (H-4).

Production Example 7

Production of Electrolyte (C-3)

To the methanol solution of 59 parts of 1,2,3,4-tetramethylimidazolinium methyl carbonate salt obtained in Production Example 1, 41 parts of a mixture (produced by) of monoethyl phosphate and diethyl phosphate was added and a salt exchange reaction was carried out to obtain a methanol solution of a mixture of 1,2,3,4-tetramethylimidazolinium monoethyl phosphate monoanion and 1,2,3,4-tetramethylimidazolinium diethyl phosphate monoanion. The above-described solution was heated under reduced pressure of 1.0 kPa or less at 50° C. to distill methanol until no distillate of methanol was observed. Thereafter, the temperature was raised from 50° C. to 100° C. and heating was continued for 30 minutes to distill and remove monomethyl carbonate ($HOCO_2CH_3$), methanol, and carbon dioxide (slight amounts of methanol and carbon dioxide are formed by thermal decomposition of monomethyl carbonate. Hereinafter, these are abbreviated as by-products). Thus, a mixed electrolyte (C-3) comprising 1,2,3,4-tetramethylimidazolinium monoethyl phosphate monoanion and 1,2,3,4-tetramethylimidazolinium diethyl phosphate monoanion was obtained. The yield was 99 parts (yield based on the weight of 59 parts of 1,2,3,4-tetramethylimidazolinium methyl carbonate salt; hereinafter the same shall apply). The molecular weights of the electrolyte (C-3) were 266 and 280.

Example 5

The electrolyte (C-3), 25 parts, was dissolved in 65 parts of the organic solvent (J-1), γ-butyrolactone. Thereto was added and mixed 10 parts of the borate ester (H-1) to obtain an electrolytic solution of the present invention. The water content was 0.7 part. The concentration of (H-1) and the concentration of (C-3) were 10 wt % and 25 wt %, respectively, relative to the total weight of (C-3), (J-1), and (H-1).

Production Example 8

Production of Electrolyte (C-4)

By adding dropwise 14 parts of 1-methylimidazole to 74 parts of a methanol solution containing 12 parts of dimethyl carbonate and stirring at 130° C. for 70 hours, there was obtained a methanol solution of 1-ethyl-3-methylimidazolium methyl carbonate salt.

By adding 50 parts of triethyl phosphate (TEP: produced by Daihachi Chemical Industries Co., Ltd.) to the methanol solution of 50 parts of 1-ethyl-3-methylimidazolium methyl carbonate salt obtained in Production Example 7 and carrying out a salt exchange reaction, there was obtained a methanol solution of 1-ethyl-3-methylimidazolium diethyl phosphate monoanion. The above-described solution was heated under reduced pressure of 1.0 kPa or less at 50° C. to distill methanol until no distillate of methanol was observed. Thereafter, the temperature was raised from 50° C. to 100° C. and heating was continued for 30 minutes to distill and remove monomethyl carbonate ($HOCO_2CH_3$), methanol, and carbon dioxide (slight amounts of methanol and carbon dioxide are formed by thermal decomposition of monomethyl carbonate. Hereinafter, these are abbreviated as by-products). Thus, 1-ethyl-3-methylimidazolium diethyl phosphate monoanion, electrolyte (C-4), was obtained. The yield was 99 parts (yield based on the weight of 50 parts of 1-ethyl-3-methylimidazolium methyl carbonate salt; hereinafter the same shall apply). The molecular weight of the electrolyte (C-4) was 266.

Example 6

The electrolyte (C-4), 25 parts, was dissolved in 72 parts of the organic solvent (J-1), γ-butyrolactone. Thereto was added and mixed 3 parts of the borate ester (H-1) to obtain an electrolytic solution of the present invention. The water content was 0.8 part. The concentration of (H-1) and the concentration of (C-4) were 3 wt % and 25 wt %, respectively, relative to the total weight of (C-4), (J-1), and (H-1).

Production Example 9

Production of Borate Ester (H-5)

Boric acid (50 parts), diethylene glycol (30 parts), and tetraethylene glycol (molecular weight 194) (20 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-5). The boron content of the borate ester (H-5) was 9.6%. The viscosity of (H-5) at 40° C. was 10.1 Pa·s.

Example 7

The electrolyte (C-1), 25 parts, was dissolved in 68 parts of an organic solvent (J-2), γ-butyrolactone/sulfolane=90/10. Thereto was added and mixed 7 parts of the borate ester (H-5) to obtain an electrolytic solution of the present invention. The water content was 0.5 part. The concentration of (H-5) and the concentration of (C-1) were 7 wt % and 25 wt %, respectively, relative to the total weight of (C-1), (J-2), and (H-5).

Production Example 10

Production of Ammonium Salt of Polyvalent Carboxylic Acid (N-1)

By adding dropwise 10 parts of 2,4-dimethylimidazoline to 74 parts of a methanol solution containing 16 parts of dimethyl carbonate and stirring at 120° C. for 15 hours, there was obtained a methanol solution of 1,2,3,4-tetramethylimidazolinium methyl carbonate salt.

By adding 42 parts of phthalic acid (produced by Kawasaki Kasei Chemicals, Ltd.) to the methanol solution of 46 parts of 1,2,3,4-tetramethylimidazolinium methyl carbonate salt obtained in Production Example 1 and carrying out a salt exchange reaction, there was obtained a methanol solution of 1,2,3,4-tetramethylimidazolinium phthalate monoanion. The above-described solution was heated under reduced pressure of 1.0 kPa or less at 50° C. to distill methanol until no distillate of methanol was observed. Thereafter, the temperature was raised from 50° C. to 100° C. and heating was continued for 30 minutes to distill and remove monomethyl carbonate ($HOCO_2CH_3$), methanol, and carbon dioxide (slight amounts of methanol and carbon dioxide are formed by thermal decomposition of monomethyl carbonate. Hereinafter, these are abbreviated as by-products). Thus, 1,2,3,4-tetramethylimidazolinium phthalate monoanion (N-1) was obtained. The yield was 99 parts (yield based on the weight of 46 parts of 1,2,3,4-tetramethylimidazolinium methyl carbonate salt; hereinafter the same shall apply). The molecular weight of (N-1) was 280.

Example 8

The electrolyte (C-1), 25 parts, was dissolved in 68 parts of the organic solvent (J-2), γ-butyrolactone/sulfolane=90/10. Thereto were added and mixed 7 parts of the borate ester (H-5) and, further, 1,2,3,4-tetramethylimidazolinium phthalate monoanion (N-1) to obtain an electrolytic solution of the present invention. The water content was 0.5 part. The concentration of (H-5) and the concentration of (C-1) were 7 wt % and 25 wt %, respectively, relative to the total weight of (C-1), (J-2), and (H-5).

Production Example 11

Production of Borate Ester (H-6')

Boric acid (50 parts), diethylene glycol (20 parts), and diethylene glycol monomethyl ether (molecular weight 120) (30 parts) were mixed and heated to 70° C., and the pressure was gradually reduced to 40 Torr to carry out esterification. Further, by heating to 105° C. and reducing the pressure to 30 Torr, esterification and evaporation of low boiling components were carried out to obtain a clear viscous liquid (80 parts). This clear viscous liquid is referred to as borate ester (H-6'). The boron content of the borate ester (H-6') was 9.7%. The viscosity of (H-6') at 40° C. was 10.8 Pa·s.

Comparative Example 1

The electrolyte (C-1), 25 parts, was dissolved in 69 parts of the organic solvent (J-1), γ-butyrolactone. Thereto was added and mixed 6 parts of the borate ester (H-6') to obtain an electrolytic solution. The water content was 0.7 part. The concentration of (H-6') and the concentration of (C-1) were 6 wt % and 25 wt %, respectively, relative to the total weight of (C-1), (J-1), and (H-6').

Production Example 12

Production of Borate Ester (H-7')

Boric acid (50 parts), diethylene glycol (20 parts), and heptaethylene glycol monoethyl ether (molecular weight 354) (30 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-7'). The boron content of the borate ester (H-7') was 9.2%. The viscosity of (H-7') at 40° C. was 9.3 Pa·s.

Comparative Example 2

The electrolyte (C-1), 25 parts, was dissolved in 69 parts of the organic solvent (J-1), α-butyrolactone. Thereto was added and mixed 6 parts of the borate ester (H-7') to obtain an electrolytic solution. The water content was 0.6 part. The concentration of (H-7') and the concentration of (C-1) were 6 wt % and 25 wt %, respectively, relative to the total weight of (C-1), (J-1), and (H-7').

Comparative Example 3

1,2,3,4-Tetramethylimidazolinium phthalate monoanion (N-1), 13 parts, was dissolved in 87 parts of the organic solvent (J-1), γ-butyrolactone. Thereto were added and mixed 4 parts of mannitol and 3 parts of boric acid to obtain an electrolytic solution. The water content was 2.6 parts. The concentration of (N-1) was 13 wt % relative to the total weight of (N-1), the organic solvent (J-1), mannitol, and boric acid.

Comparative Example 4

The electrolyte (C-1), 25 parts, was dissolved in 75 parts of the organic solvent (J-1), γ-butyrolactone, to obtain an electrolytic solution. The water content was 0.3 part. The concentrations of (C-1) was 25 wt % relative to the total weight of (C-1) and (J-1).

Production Example 13

Production of Borate Ester (H-8')

Boric acid (15 parts), diethylene glycol (43 parts), and tetraethylene glycol monomethyl ether (molecular weight 208) (42 parts) were mixed and heated to 80° C., and the pressure was gradually reduced to 30 Torr to carry out esterification. Further, by heating to 105° C., esterification and evaporation of low boiling components were carried out to obtain a clear viscous liquid (80 parts). This clear viscous liquid is referred to as borate ester (H-8'). The boron content of the borate ester (H-8') was 3.5%. The viscosity of (H-8') at 40° C. was 3.5 Pa·s.

Comparative Example 5

The electrolyte (C-1), 25 parts, was dissolved in 69 parts of the organic solvent (J-1), γ-butyrolactone. Thereto was added and mixed 6 parts of the borate ester (H-8') to obtain an electrolytic solution of the present invention. The water content was 0.6 part. The concentration of (H-8') and the concentration of (C-1) were 6 wt % and 25 wt %, respectively, relative to the total weight of (C-1), (J-1), and (H-8').

The electrolytic solutions obtained in Examples 1-8 of the present invention and Comparative Examples 1-5 were subjected to measurement of water content, sparking voltage, and specific conductivity according to the following measurement methods. The results are shown in Table 1 and Table 2.

<Water Content>

Content of water: This was measured by a Karl Fischer coulometric titration method using an automatic water content measuring instrument, AQ-7, manufactured by Hiranuma Sangyo Co., Ltd.

<Viscosity>

Viscosity measurement was performed by a rheometer, AR-2000, manufactured by TA Instruments, Japan, using a cone plate of 40 mm diameter and under a frequency condition of 6.284 rad/s.

<Sparking Voltage>

Sparking Voltage: The sparking voltage of the electrolytic solution was measured at 25° C. when a constant current (2 mA) was applied, using a 10 $cm^2$, chemically etched aluminum foil for high voltage use as the anode and a 10 $cm^2$, plain aluminum foil as the cathode.

<Specific Conductivity>

Specific conductivity: The specific conductivity was measured at 30° C. using an electrolytic conductivity meter, CM-40S, manufactured by Toa Electronics Ltd.

TABLE 1

| | Electrolytic solution composition | Composition (parts) | Boron content of borate ester (%) | Water content (%) | Sparking voltage (V) | Specific conductivity (mS/cm) | Average expansion of product after 2 reflow cycles (mm) | Frequency of short circuit/ number of samples tested |
|---|---|---|---|---|---|---|---|---|
| Example 1 | γ-Butyrolactone (J-1) | 69 | 9.4 | 0.6 | 250 | 7.2 | 0.46 | 0/100 |
| | 1,2,3,4-Tetramethylimidazolinium dibutyl phosphate (C-1) | 25 | | | | | | |
| | Borate ester (H-1) | 6 | | | | | | |
| Example 2 | γ-Butyrolactone (J-1) | 69 | 5.1 | 0.7 | 238 | 7.4 | 0.39 | 0/100 |
| | 1,2,3,4-Tetramethylimidazolinium dibutyl phosphate (C-1) | 25 | | | | | | |
| | Borate ester (H-2) | 6 | | | | | | |
| Example 3 | γ-Butyrolactone (J-1) | 69 | 13.9 | 0.6 | 260 | 6.8 | 0.47 | 0/100 |
| | 1,2,3,4-Tetramethylimidazolinium dibutyl phosphate (C-1) | 25 | | | | | | |
| | Borate ester (H-3) | 6 | | | | | | |

TABLE 1-continued

|  | Electrolytic solution composition | Composition (parts) | Boron content of borate ester (%) | Water content (%) | Sparking voltage (V) | Specific conductivity (mS/cm) | Average expansion of product after 2 reflow cycles (mm) | Frequency of short circuit/ number of samples tested |
|---|---|---|---|---|---|---|---|---|
| Example 4 | γ-Butyrolactone (J-1) | 69 | 9.5 | 0.8 | 250 | 7.2 | 0.45 | 0/100 |
|  | 1,2,3,4-Tetramethylimidazolinium diethyl phosphate (C-2) | 25 |  |  |  |  |  |  |
|  | Borate ester (H-4) | 6 |  |  |  |  |  |  |
| Example 5 | γ-Butyrolactone (J-1) | 65 | 9.4 | 0.7 | 214 | 7.3 | 0.48 | 0/100 |
|  | Mixture of 1,2,3,4-tetramethyl-imidazolinium monoethyl phosphate and 1,2,3,4-tetramethylimidazolinium diethyl phosphate (C-3) | 25 |  |  |  |  |  |  |
|  | Borate ester (H-1) | 10 |  |  |  |  |  |  |
| Example 6 | γ-Butyrolactone (J-1) | 72 | 9.4 | 0.8 | 220 | 6.3 | 0.47 | 0/100 |
|  | 1-Ethyl-3-methylimidazolium diethyl phosphate (C-4) | 25 |  |  |  |  |  |  |
|  | Borate ester (H-1) | 3 |  |  |  |  |  |  |
| Example 7 | γ-Butyrolactone/sulfolane = 90/10 (J-2) | 68 | 9.6 | 0.5 | 267 | 6.5 | 0.43 | 0/100 |
|  | 1,2,3,4-Tetramethylimidazolinium dibutyl phosphate (C-1) | 25 |  |  |  |  |  |  |
|  | Borate ester (H-5) | 7 |  |  |  |  |  |  |

TABLE 2

|  | Electrolytic solution composition | Composition (parts) | Boron content of borate ester (%) | Water content (%) | Sparking voltage (V) | Specific conductivity (mS/cm) | Average expansion of product after 2 reflow cycles (mm) | Frequency of short circuit/ number of samples tested |
|---|---|---|---|---|---|---|---|---|
| Example 8 | γ-Butyrolactone/sulfolane = 90/10 (J-2) | 68 | 9.6 | 0.5 | 216 | 7.0 | 0.45 | 0/100 |
|  | 1,2,3,4-Tetramethylimidazolinium dibutyl phosphate (C-1) | 25 |  |  |  |  |  |  |
|  | Borate ester (H-5) | 7 |  |  |  |  |  |  |
|  | 1,2,3,4-Tetramenylimidazolinium phthalate (N-1) | 2 |  |  |  |  |  |  |
| Comparative Example 1 | γ-Butyrolactone (J-1) | 69 | 9.7 | 0.7 | 200 | 7.5 | 0.89 | 7/100 |
|  | 1,2,3,4-Tetramethylimidazolinium dibutyl phosphate (C-1) | 25 |  |  |  |  |  |  |
|  | Borate ester (H-6') | 6 |  |  |  |  |  |  |
| Comparative Example 2 | γ-Butyrolactone (J-1) | 69 | 9.2 | 0.6 | 279 | 4.5 | 0.49 | 0/100 |
|  | 1,2,3,4-Tetramethylimidazolinium dibutyl phosphate (C-1) | 25 |  |  |  |  |  |  |
|  | Borate ester (H-7') | 6 |  |  |  |  |  |  |
| Comparative Example 3 | γ-Butyrolactone (J-1) | 87 | — | 2.6 | 120 | 6.0 | 1.09 | 0/100 |
|  | 1,2,3,4-Tetramethylimidazolinium phthalate (N-1) | 13 |  |  |  |  |  |  |
|  | Mannitol | 4 |  |  |  |  |  |  |
|  | Boric acid | 3 |  |  |  |  |  |  |
| Comparative Example 4 | γ-Butyrolactone (J-1) | 75 | — | 0.3 | 176 | 8.6 | 0.71 | 8/100 |
|  | 1,2,3,4-Tetramethylimidazolinium dibutyl phosphate (C-1) | 25 |  |  |  |  |  |  |
| Comparative Example 5 | γ-Butyrolactone (J-1) | 69 | 3.5 | 0.6 | 200 | 7.6 | 0.47 | 5/100 |
|  | 1,2,3,4-Tetramethylimidazolinium dibutyl phosphate (C-1) | 25 |  |  |  |  |  |  |
|  | Borate ester (H-8') | 6 |  |  |  |  |  |  |

As is clear from Table 1 and Table 2, Examples 1-8 show higher specific conductivities and sparking voltages than Comparative Example 3, thus making it possible to lower the resistance of capacitors and to improve the reliability without causing a short circuit. Moreover, the contents of water which causes an expansion of the capacitor in the reflow process are maintained at low levels. Also, addition of the borate esters made it possible to increase the sparking voltages as compared with Comparative Example 4. In Comparative Example 2, because the viscosity of the borate ester is very high, the viscosity of the electrolytic solution increases significantly, resulting in a lower specific conductivity and a higher resistance of the capacitor.

Using the electrolytic solutions of Examples 1-8 of the present invention and Comparative Examples 1-5, wound chip-type aluminum electrolytic capacitors (rated voltage: 100 V, electrostatic capacitance: 22 μF, size: φ 8 mm×L 10.2 mm) were prepared. As the sealing rubber, there was used resin-vulcanized butyl rubber. The capacitors prepared were passed through a reflow oven twice under conditions of top temperature of 260° C., 230° C. for more than 60 seconds, and 200° C. for more than 150 seconds. The expansion of the capacitors was measured, with the results shown in Table 1 and Table 2.

From the results in Table 1 and Table 2, it can be seen that the electrolytic solutions of Examples 1-8 of the present invention, by virtue of low water contents thereof, show very slight expansions due to reflow as compared with Comparative Example 3. Furthermore, by addition of the borate esters, the expansion could be suppressed at a smaller level than that in Comparative Example 4.

By applying a voltage of 100V to capacitors of Examples 1-8 of the present invention and Comparative Examples 1-5, observation was made whether or not a short circuit of the capacitor occurred within 2000 hours at 125° C. The number of test pieces was 100 for each capacitor, of which the number of test pieces which showed a short circuit is shown in Table 1 and Table 2.

While the electrolytic solutions of Examples 1-8 of the present invention did not show any short circuit, in Comparative Example 1, precipitation of boric acid was observed on the surface of the sealing rubber and a short circuit occurred. Furthermore, there occurred a short circuit also in Comparative Example 4 wherein no borate ester had been added.

It can be seen that the electrolytic solution of Example 1 of the present invention has a higher sparking voltage than the electrolytic solution of Comparative Example 5 because the borate ester (H-1) having a high boron content was used in the former. In addition, any short circuit of the capacitor does not occur because the borate ester (H-1) having a high boron content was used.

It can be seen that the electrolytic solution of Example 8 of the present invention shows a higher specific conductivity than the electrolytic solution of Example 7 because the electrolyte (N) was added to the former.

From the above, the aluminum electrolytic capacitor of the present invention shows only a slight expansion of the capacitor in the reflow process and has high reliability without causing a short circuit.

INDUSTRIAL APPLICABILITY

The electrolytic solution of the present invention can be applied to an aluminum electrolytic capacitor for such uses as an electrical power source for vehicle-mounted electrical equipments, a digital home appliance, and the like.

The invention claimed is:

1. An electrolytic solution for an aluminum electrolytic capacitor, comprising an electrolyte (C) comprising an alkyl phosphate anion (a) represented by the following general formula (1) or (2) and an amidinium cation (b); a borate ester (H) which is obtained by reacting boric acid (d) with diethylene glycol (e) and a polyalkylene glycol (f) having a molecular weight of 130-350 and/or a polyalkylene glycol monoalkyl ether (g) having a molecular weight of 130-350, and which has a boron content of 5-14 wt %; and an organic solvent (J):

[Formula 1]

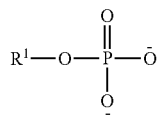

(1)

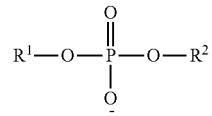

(2)

wherein $R^1$ is an alkyl group having 1-10 carbon atoms and $R^2$ is a hydrogen atom or an alkyl group having 1-10 carbon atoms; and $R^1$ and $R^2$ may be the same or different.

2. The electrolytic solution according to claim 1, wherein the polyalkylene glycol monoalkyl ether (g) is an adduct of ethylene oxide and/or propylene oxide and the alkyl is an alkyl group having 1-3 carbon atoms.

3. The electrolytic solution according to claim 1, wherein the content of the electrolyte (C) is 2-70 wt % based on the total weight of the electrolyte (C), the borate ester (H), and the organic solvent (J).

4. The electrolytic solution according to claim 2, wherein the content of the electrolyte (C) is 2-70 wt % based on the total weight of the electrolyte (C), the borate ester (H), and the organic solvent (J).

5. The electrolytic solution according to claim 1, wherein the content of the borate ester (H) is 1-30 wt % based on the total weight of the electrolyte (C), the borate ester (H), and the organic solvent (J).

6. The electrolytic solution according to claim 2, wherein the content of the borate ester (H) is 1-30 wt % based on the total weight of the electrolyte (C), the borate ester (H), and the organic solvent (J).

7. The electrolytic solution according to claim 3, wherein the content of the borate ester (H) is 1-30 wt % based on the total weight of the electrolyte (C), the borate ester (H), and the organic solvent (J).

8. The electrolytic solution according to claim 1, further comprising an ammonium salt (N) of a polyvalent carboxylic acid.

9. The electrolytic solution according to claim 2, further comprising an ammonium salt (N) of a polyvalent carboxylic acid.

10. The electrolytic solution according to claim 3, further comprising an ammonium salt (N) of a polyvalent carboxylic acid.

11. The electrolytic solution according to claim 5, further comprising an ammonium salt (N) of a polyvalent carboxylic acid.

12. An aluminum electrolytic capacitor comprising the electrolytic solution according to claim 1.

13. An aluminum electrolytic capacitor comprising the electrolytic solution according to claim 2.

14. An aluminum electrolytic capacitor comprising the electrolytic solution according to claim 3.

15. An aluminum electrolytic capacitor comprising the electrolytic solution according to claim 5.

16. An aluminum electrolytic capacitor comprising the electrolytic solution according to claim 8.

17. The electrolytic solution according to claim 3, wherein the content of the electrolyte (C) is 15-35 wt % based on the total weight of the electrolyte (C), the borate ester (H), and the organic solvent (J).

18. The electrolytic solution according to claim 4, wherein the content of the electrolyte (C) is 15-35 wt % based on the total weight of the electrolyte (C), the borate ester (H), and the organic solvent (J).

* * * * *